United States Patent [19]

Cruz-Uribe

[11] Patent Number: 4,695,854

[45] Date of Patent: Sep. 22, 1987

[54] EXTERNAL MANIFOLD FOR INK JET ARRAY

[75] Inventor: Antonio S. Cruz-Uribe, Cobalt, Conn.

[73] Assignee: Pitney Bowes Inc., Stamford, Conn.

[21] Appl. No.: 890,665

[22] Filed: Jul. 30, 1986

[51] Int. Cl.⁴ .......... G01D 15/18

[52] U.S. Cl. .......... 346/140 R

[58] Field of Search .......... 346/140

[56] References Cited

U.S. PATENT DOCUMENTS

| | | | |
|---|---|---|---|
| 3,107,630 | 10/1963 | Johnson et al. . | |
| 3,211,088 | 10/1965 | Naiman . | |
| 3,298,030 | 1/1967 | Lewis et al. . | |
| 3,683,212 | 8/1972 | Zoltan . | |
| 3,747,120 | 7/1973 | Stemme | 346/140 X |
| 3,946,398 | 3/1976 | Kyser et al. . | |
| 4,126,868 | 11/1978 | Kirner . | |
| 4,189,734 | 2/1980 | Kyser et al. . | |
| 4,216,483 | 8/1980 | Kyser et al. . | |
| 4,317,124 | 2/1982 | Shirato | 346/140 |
| 4,339,763 | 7/1982 | Kyser et al. . | |
| 4,380,770 | 4/1983 | Maruyama . | |
| 4,392,145 | 7/1983 | Parkola | 346/140 |
| 4,429,320 | 1/1984 | Hattori et al. . | |
| 4,433,341 | 2/1984 | Thomas . | |
| 4,459,601 | 7/1984 | Howkins | 346/140 |
| 4,525,728 | 6/1985 | Koto . | |
| 4,528,575 | 7/1985 | Matsuda | 346/140 |
| 4,605,939 | 8/1986 | Hubbard | 346/140 |
| 4,611,219 | 9/1986 | Sugitani | 346/140 |

*Primary Examiner*—Joseph W. Hartary
*Attorney, Agent, or Firm*—Peter Vrahotes; Melvin J. Scolnick; David E. Pitchenik

[57] ABSTRACT

An impulse ink jet print head of the type including a plurality of operating plates held together in a contiguous superposed relationship. A plurality of piezoceramic transducers are mounted on a diaphragm such that each transducer overlies one of a similar plurality of ink chambers. The transducers are electrically energized and thereby caused to displace ink in the chambers resulting in the ejection of ink droplets through a plurality of nozzles, one nozzle being in fluidic communication with each of said chambers. An IC driver may be interfaced between an external control computer and the transducers to simplify the external circuitry necessary for operation of the print head. Ink is delivered to the chambers through compliant manifolds mounted externally of the print head, then through restrictor orifices formed in the same plate in which the nozzles are located. The construction allows for venting of the manifolds. The manifolds are constructed of material having sufficient compliance to absorb pressure waves which occur therein so as to avoid the undesirable phenomenon known as "cross talk" whereby pressure impulses intended for one system comprising an interconnected restrictor orifice, compression chamber, and nozzle are communicated to another such system in the print head.

45 Claims, 5 Drawing Figures

EXTERNAL MANIFOLD FOR INK JET ARRAY

BACKGROUND OF THE INVENTION

I. Field of the Invention

The present invention relates to an impulse ink jet print head comprised of a plurality of plates held together in a superposed contiguous relationship and including an external compliant manifold.

II. Description of the Prior Art

Ink jet systems, and particularly impulse ink jet systems, are well known in the art. The principle behind an impulse ink jet as embodied in the present invention is the displacement of ink and the subsequent emission of ink droplets from an ink chamber through a nozzle by means of a driver mechanism which consists of a transducer (e.g., of piezoceramic material) bonded to a thin diaphragm. When a voltage is applied to the transducer, the transducer attempts to change its planar dimensions, but because it is securely and rigidly attached to the diaphragm, bending occurs. This bending displaces ink in the chamber, causing outward flow both through an inlet from the ink supply, or restrictor, and through an outlet or nozzle. The relative fluid impedances of the restrictor and nozzle are such that the primary outflow is through the nozzle. Refill of the ink chamber after a droplet emerges from the nozzle results from the capillary action of the ink meniscus within the nozzle which can be augmented by reverse bending of the transducer. Time for refill depends on the viscosity and surface tension of the ink as well as the impedance of the fluid channels. A subsequent ejection will then occur but only when refill has been accomplished and when, concurrently, the amplitude of the oscillations resulting from the first ejection have become negligible. Important measures of performance of an ink jet are the response of the meniscus to the applied voltage and the recovery time required between droplet ejections having uniform velocity and drop diameter.

In general, it is desirable to employ a geometry that permits several nozzles to be positioned in a densely packed array. In such an array, however, it is important that the individual nozzles eject ink droplets of uniform diameter and velocity even at varying droplet ejection rates.

Some representative examples of the prior art will now be described. U.S. Pat. No. 3,107,630 to Johnson et al is an early disclosure of the use of piezoceramic transducers being utilized to produce a high frequency cyclic pumping action. This was followed by U.S. Pat. No. 3,211,088 to Naiman which discloses the concept of an impulse ink jet print head. According to Naiman, when a voltage is applied to a transducer, ink is forced through the nozzle to form a spot upon a printing surface. The density of the spots so formed is determined by the number of nozzles employed in a matrix. Another variation of print head is disclosed in U.S. Pat. No. 3,767,120 issued to Stemme which utilizes a pair of chambers positioned in series between the transducer and the discharge nozzle.

Significant improvements over the then existing prior art are disclosed in a series of patents issued to Kyser et al, namely, U.S. Pat. Nos. 3,946,398, 4,189,734, 4,216,483, and 4,339,763. According to each of these disclosures, fluid droplets are projected from a plurality of nozzles at both a rate and in a volume controlled by electrical signals. In each instance, the nozzle requires that an associated transducer, and all of the components, lie in planes parallel to the plane of the droplets being ejected.

A more recent disclosure of an ink jet print head is provided in the U.S. Pat. No. 4,525,728 issued to Koto. In this instance, the print head includes a substrate having a plurality of pressurization chambers of rectangular configuration disposed thereon. Ink supply passages and nozzles are provided for each pressurization chamber. Each chamber also has a vibrating plate and a piezoceramic element which cooperate to change the volume of the pressurization chamber to cause ink to be ejected from the respective nozzles thereof.

In many instances of the prior art, ink jet print heads are assembled from a relatively large number of discrete components. The cost of such a construction is generally very high. For example, an array of ink jets requires an array of transducers. Typically, each transducer is separately mounted adjacent to the ink chamber of each jet by an adhesive bonding technique. This presents a problem when the number of transducers in the array is greater than, for example, a dozen, because complications generally arise due to increased handling complexities, for example, breakage or failure of electrical connections. In addition, the time and parts expense rise almost linearly with the number of separate transducers that must be bonded to the diaphragm. Furthermore, the chances of a failure or a wider spread in performance variables such as droplet volume and speed, generally increase. Additionally, in many instances, prior art print heads were large and cumbersome and could accommodate relatively few nozzles within the allotted space.

An advanced construction of impulse ink jet print head which overcomes many of the previously existing problems is disclosed in copending commonly assigned U.S. patent application Ser. No. 795,584, filed Nov. 6, 1985, of A. Cruz-Uribe et al entitled "Impulse Ink Jet Print Head and Method of Making Same" The present invention utilizes many of the teachings presented in that disclosure but in some respects provides an alternative construction. For example, the print head disclosed in both instances is formed of a plurality of operating plates, all lying in parallel planes, held together in a contiguous superposed relationship.

SUMMARY OF THE INVENTION

In brief, the present invention is directed towards an improved impulse ink jet print head of the type including a plurality of operating plates held together in a contiguous superimposed relationship. A plurality of piezocermic transducers are mounted on a diaphragm such that each transducer overlies one of a similar plurality of ink chambers. The transducers are electrically energized and thereby caused to displace ink in the chambers resulting in the ejection of ink droplets through a plurality of nozzles, one nozzle being in fluidic communication with each of said chambers. Ink is delivered to the chambers through compliant manifolds mounted externally of the print head, then through restrictor orifices formed in the same plate in which the nozzles are located. An IC driver surface mounted on a printed circuit board controls the electrical signals applied to the transducers through a planar anisotropic connector which overlies the transducers and is only conductive in a transverse direction. The construction allows for venting of the manifolds. The manifolds are constructed of material having sufficient compressibility to absorb pressure waves which occur therein so as to avoid the undesirable phenomenon known as "cross talk" whereby pressure impulses intended for one system comprising an interconnected restrictor orifice, compression chamber, and nozzle are communicated to another such system in the print head.

One advantage of the present invention includes a lower material cost by reason of a reduced number of plates required for the print head. In the preferred construction described, restrictor orifices are formed in the same plate as the nozzles. Also, the manifold can be fabricated from materials which are substantially less costly than those required for many of the plates.

Another advantage of the invention resides in the external mounting of the manifolds which deliver ink to the ink chambers via the restrictor orifices. One wall of each manifold is composed of a flexible material which absorbs pressure waves occurring as the result of a transducer being energized. This reduces or eliminates "cross-talk".

Also, a problem with prior art constructions which had an adverse effect on obtaining uniform signals from all nozzles regardless of its position in the print head has been recognized and corrected by the invention. Specifically, the opposite ends of the chamber groupings in the print head have passive chambers sized and shaped like all the other chambers but without transducers or nozzles associated therewith. In prior constructions, the last of a series of chambers bordered, on its outermost side, a relatively large mass or portion of the plate in which is was formed while its intermost long side was in fact a sidewall substantially identical to all the other sidewalls between successive chambers. This caused a situation in which the characteristics of droplets ejected in response to a signal applied to a transducer associated with an end chamber would be different from those of droplets ejected in response to a signal applied to a transducer associated with a centally located chamber. However, by reason of the invention, all active chambers are in fact centrally located chambers with the desired result that the characteristics of all droplets ejected from the print head are uniform regardless of the nozzle.

Another expedient which supplements the compliant design of the manifolds to combat cross-talk is the provision of vents in the print head which enable air in the system to be drawn off without deleteriously affecting the rate or quality of droplet emission. Known print heads have employed air venting devices such as those disclosed in U.S. Pat. Nos. 4,126,868 to Kirner, 4,380,770 to Maruyama, 4,429,320 to Hattori et al, and 4,433,341 to Thomas. However, such known constructions do not possess the overall features provided by the present invention.

Other and further features, objects, advantages, and benefits of the invention will become apparent from the following description taken in conjunction with the following drawings. It is to be understood that both the foregoing general description and the following detailed description are exemplary and explanatory but not restrictive of the invention. The accompanying drawings, which are incorporated in and constitute a part of this invention, illustrate some of the embodiments of the invention and, together with the description, serve to explain the principles of the invention in general terms. Like numerals refer to like parts throughout the disclosure.

DESCRIPTION OF THE PREFERRED EMBODIMENT

Primary goals sought to be achieved in the design of an ink jet print head are reproducibility, high drop emission rate, ease of fabrication utilizing highly automated techniques, increased nozzle density, uniformity of performance among individual jets, and all of these with minimum cost. Such goals have been achieved by the present invention.

Figure 1:
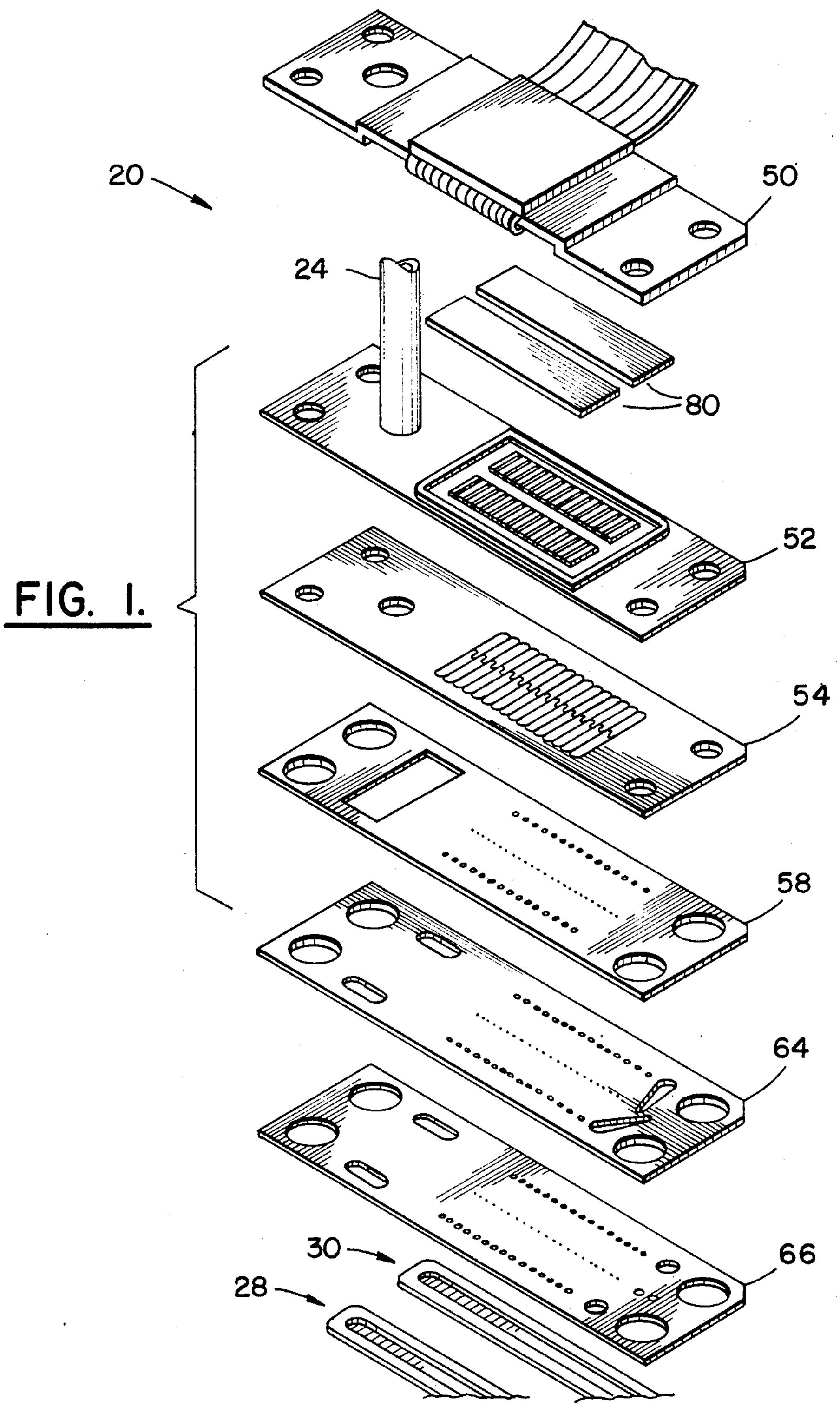
FIG. 1 is an exploded perspective view of a plurality of discrete plates employed in the construction of an ink jet print head embodying the present invention.

Turn initially to FIG. 1 which illustrates an ink jet print head 20 generally embodying the invention. Although FIG. 1 illustrates a 28 nozzle print head, the concept of the invention can be reduced to a one or two nozzle configuration or can be extended to an n-nozzle array. That is, the concept of the invention can be employed for as many nozzles as desired, subject to material and size limitations. As illustrated in FIGS. 1 and 2, the print head 20 is comprised of a plurality of superposed, contiguous laminae or plates collectively represented by a reference numeral 22 (FIG. 3). Each of the plates 22 is individually fabricated and has a particular function as a component of the print head.

FIG. 2 is a diagrammatic representation provided for the purpose of illustrating the arrangement of the plates 22 in an operational print head 20, but is not intended to otherwise illustrate the relative dimensions or number of nozzles and associated elements of the print head 20 as shown in FIG. 1.

Figure 2A:
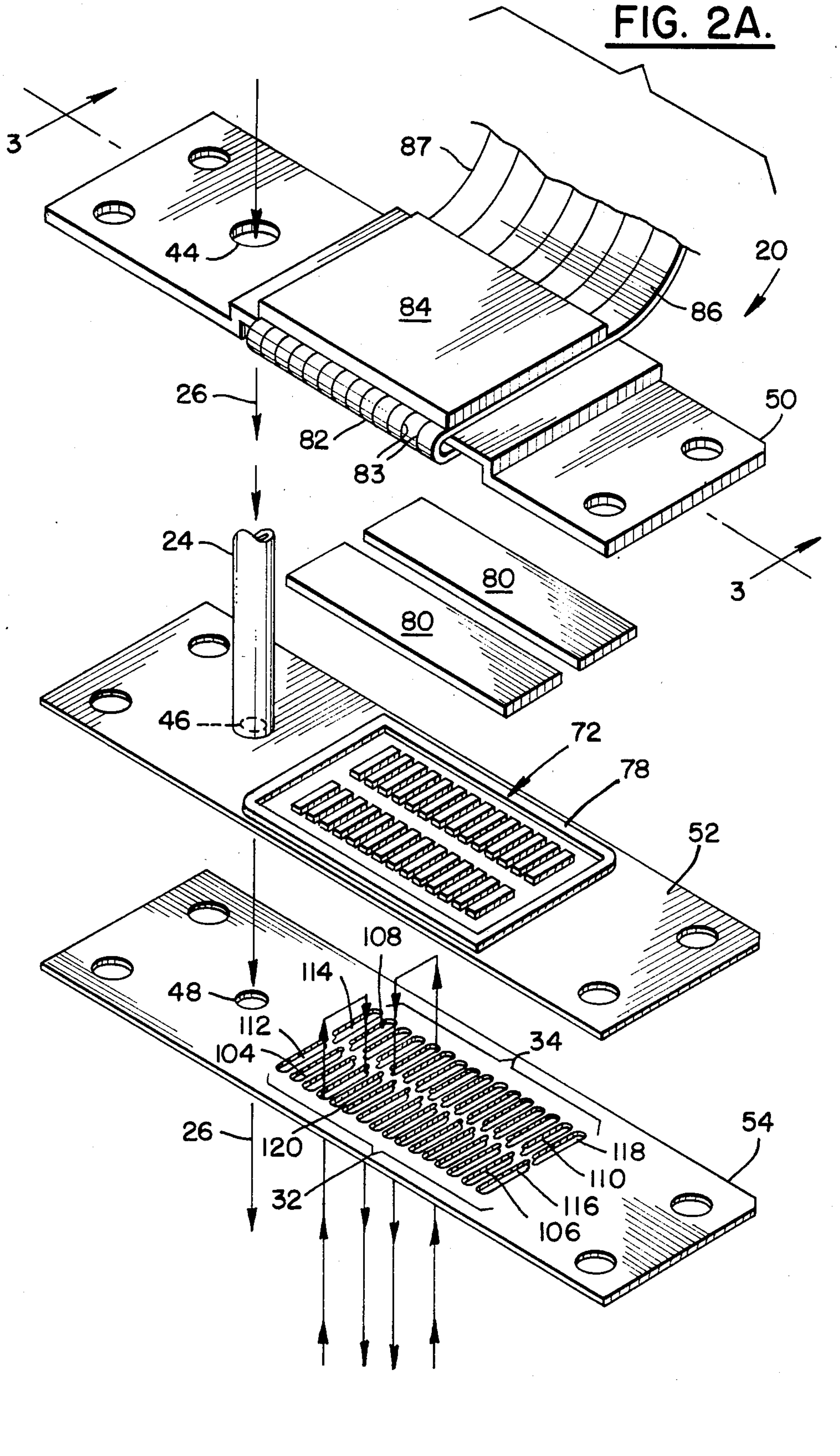
FIGS. 2A and 2B are, collectively, an enlarged exploded perspective view of the construction illustrated in FIG. 1.
Figure 2B:
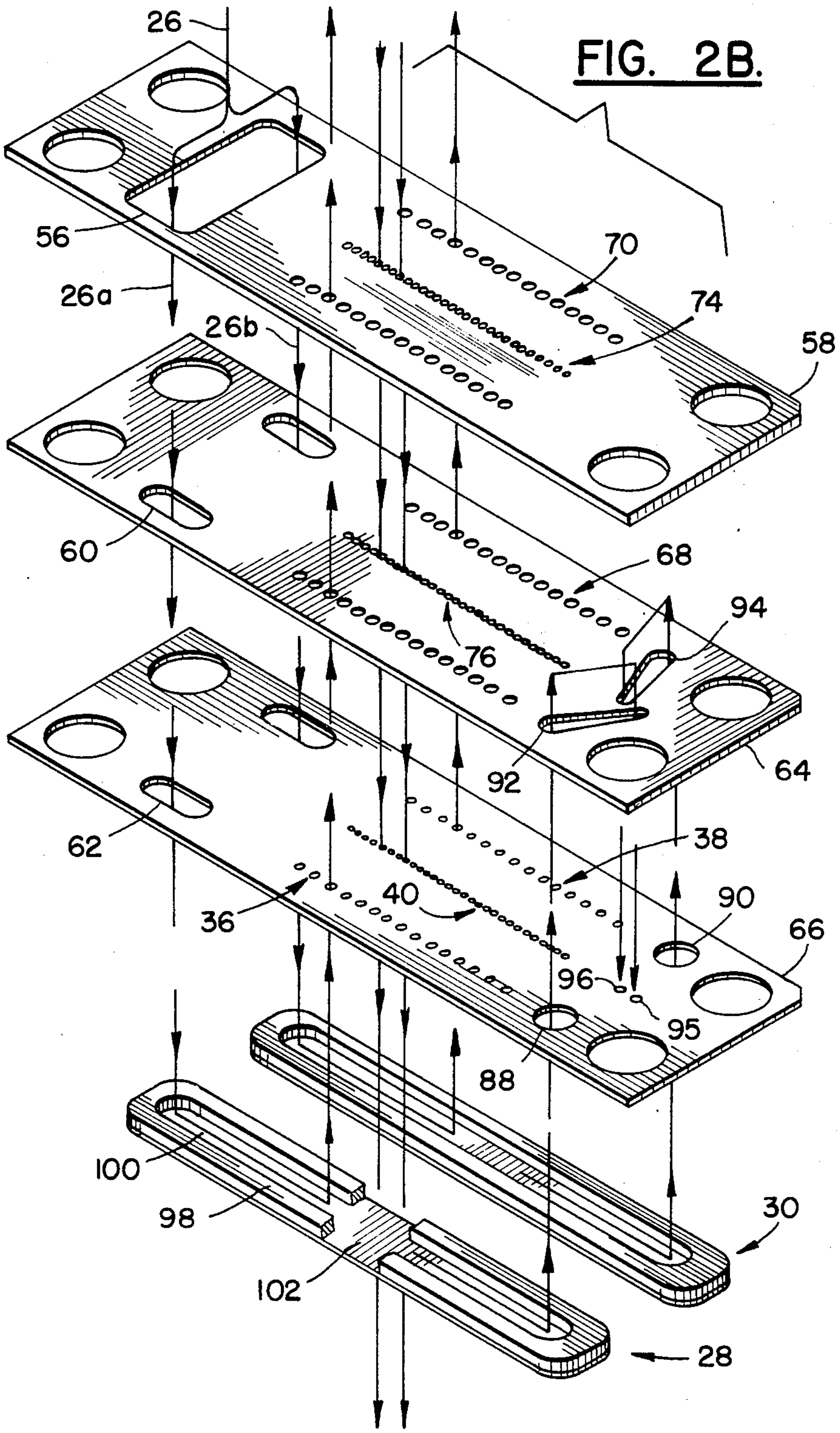
Figure 3:
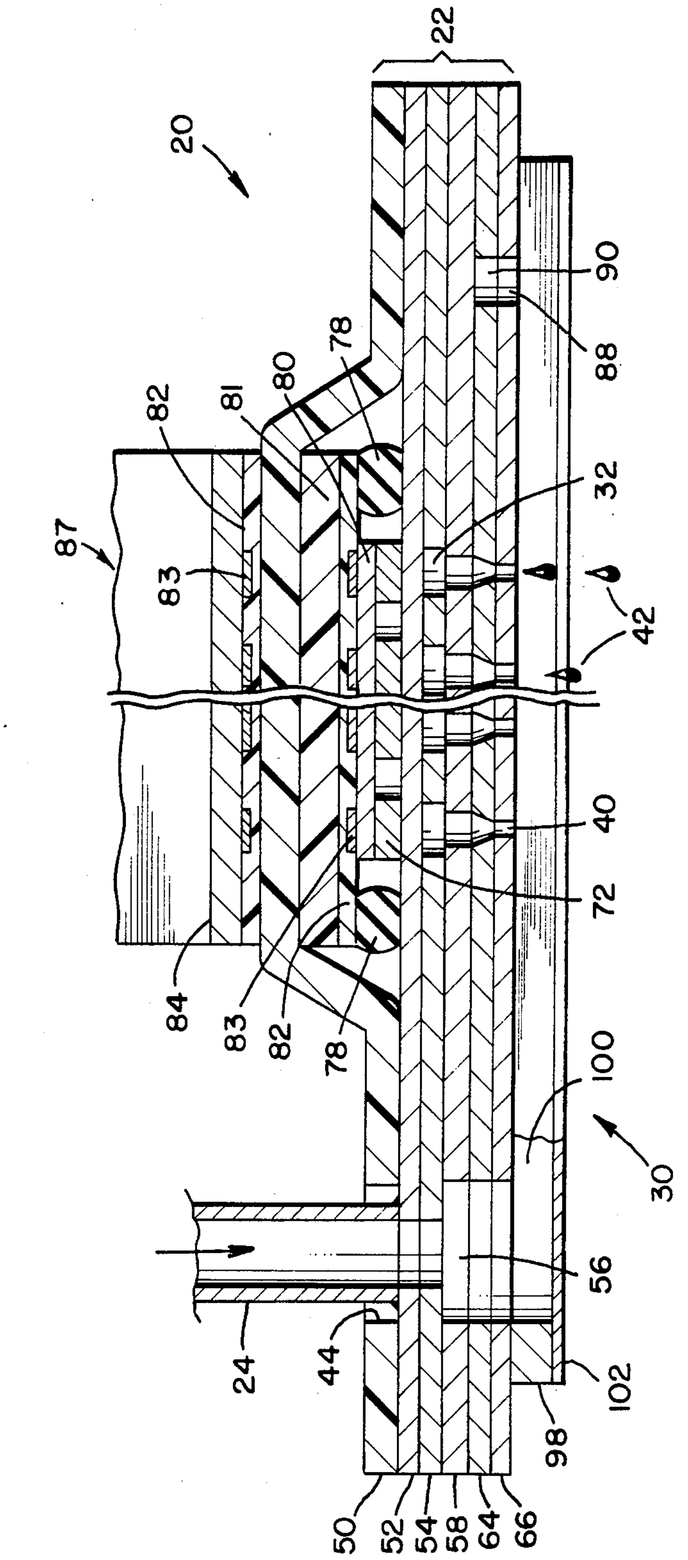
FIG. 3 is a cross section view taken generally along line 3—3 in FIG. 2A.

As particularly seen in FIGS. 2A and 2B, ink enters through a feed tube 24 and continues through the print head 20 along a path 26 as indicated by a continuous series of arrowheads. The path of the ink then splits into a pair of discrete paths **26*a* and 26*b* so as to flow into a pair of manifolds 28 and 30. From the manifolds 28 and 30, the ink then flows, respectively, into opposed chambers 32 and 34 through restrictor orifices 36 and 38, then to nozzles 40 through which discrete ink droplets 42 are ejected. It will be appreciated that the feed tube 24 extends through a suitable pass hole 44 formed in a shaped, substantially rigid, clamping board 50. The lowermost end of the feed tube 24 is sealingly attached in any suitable fashion to a diaphragm plate 52**.

As the ink flows from the feed tube 24 to the manifolds 28 and 30, it passes through aligned holes 46 and 48 formed, respectively, in the diaphragm plate 52 and in a chamber plate 54. The split in the path 26 resulting in the dual paths **26*a* and 26*b* is achieved by means of a widened compartment 56 formed in a base plate 58. From the compartment 56, the ink flows through pairs of elongated holes 60 and 62 formed respectively, in an intermediate plate 64 and in a nozzle plate 66**.

From each of the manifolds 28 and 30, the ink reverses direction and travels to the chambers 32 and 34 through the restrictor orifices 36 and 38 formed in the nozzle plate 66, then through holes 68 in the intermediate plate 64 and through connector holes 70 in the base plate 58.

Each series of the opposed chambers 32 and 34 formed in the chamber plate 54 extends completely therethrough and can be formed in a suitable manner as by etching. A typical thickness for the chamber plate is ten mils, but this dimension as with all of the other dimensions mentioned herein can vary considerably and still be within the scope of the invention. The roof of the chambers 32 and 34 which is the diaphragm plate 52, is typically three mils thick and has a plurality of discrete transducers 72 composed of a suitable piezoceramic material mounted thereon, each transducer overlying and coextensive with one of the chambers. Upon the application of an electrical field to a transducer 72, the diaphragm plate 52 is caused to bend into its associated chamber thereby resulting in the displacement of the ink within the chamber. This in turn results in ejection of a droplet from the associated nozzle and subsequent oscillation of the meniscus and refill of the chamber. In proceeding from the chamber to the nozzle, the ink flows first through an enlarged connector hole 74 in the base plate 58, then through a tapered hole 76 in the plate 64.

Two important resonant modes are associated with these motions, usually at approximately 10 to 24 kHz and 2 to 4 kHz, respectively. Provided the kinetic energy of the ink in the nozzle exceeds the surface energy of the meniscus at the nozzle 40, a droplet 42 is ejected. Sufficient energy is imparted to the droplet so it achieves a velocity of at least 2 m/sec. and thereby travels to a printing surface (not shown) proximate to the print head 20. The dimensions of the transducers 72, the diaphragm plate 52, the nozzles 40, the chambers 32 and 34, and the restrictor orifices 36 and 38 all influence the performance of the ink jet. Choice of these dimensions is coordinated with choice of an ink of a given viscosity. The shape of the electrical voltage pulse is also tailored to achieve the desired drop velocity, refill time, and elimination of extraneous droplets, usually referred to as satellites. A preferred diameter of the nozzles 40 is 0.002 to 0.003 inches and the ratio of the length to width of the transducers 72, which are preferably rectangular in shape, is approximately 3.5 to 1.

The plates 22 comprising the print head 20 may be fabricated from stainless steel or some other alloy, or from glass, or from other suitably stiff but workable material. As appropriate, they may be held together by using adhesives, brazing, diffusion bonding, electron beam welding or resistance welding. In some instances, suitable fasteners may be used.

As illustrated in FIG. 1, the individual chambers 32 and 34 are approximately rectangular, each having relatively long sidewalls and relatively short endwalls. A pair of chambers 30 is axially aligned along their major axes and is proximately opposed to one another at their respectively endwalls. As illustrated, each of the opposed endwalls extends towards the other of the chambers in an interlaced relationship and overlaps a plane transverse to the chamber plate and containing axes of connector holes 74 formed in the base plate 58 and leading to the nozzles 40. A more detailed description of this construction is recited in U.S. application Ser. No. 795,584 noted above, which disclosure is incorporated herein by reference.

Connector holes 74 and tapered holes 76 are formed in the base plate 58 and in the intermediate plate 64, respectively, to thereby connect each chamber to an associated one of the nozzles 40. The diameters of the connector holes 74 are approximately 12 to 16 mils in diameter, and each tapered hole 76 is tapered from the 12 to 16 mil diameter at its interface with the connector hole to a diameter of approximately two to three mils at its interface with the nozzle 40. The tapered holes 76 assure smooth transitional flow of the ink as it travels from the chambers to the nozzles. Each set of chambers, connector holes 74, tapered holes 76, and nozzles 40 are preferably axially aligned, their axes being perpendicular, or at least transverse to, the plane of the base plate 58. The dimensions of the connector holes 74 and of the tapered holes 76 also influence the performance of the ink jet.

In a similar fashion, each set of restrictor orifices 36, 38, of pass holes 68 and 70, and chambers 32, 34 are preferably axially aligned, their axes being perpendicular, or at least transverse to, the plane of the base plate 58. The diameters of the pass holes are approximately 15 to 20 mils in diameter.

A plurality of pairs of the axially aligned chambers are formed in the chamber plate 54 in side by side relationship along their respective sidewalls. While fourteen such pairs of the chambers 32 and 34 are illustrated in FIG. 1 connected to fourteen associated nozzles 40, it will be appreciated that the arrangement described can be utilized for as few or as many nozzles as reasonably desired. By reason of the interlaced relationship of the endwalls of the chambers and their associated nozzles 40, a high density of the nozzles can be achieved while assuring the proper size of a chamber for the ejection of the droplets 42 from the nozzles 40. In a typical construction, the distance between centers of the nozzles is between 0.020 inches and 0.030 inches.

The restrictor orifices 36 and 38 separate the chambers 32 and 34, respectively, from the ink supply manifolds 28 and 30. The restrictor orifices formed in the nozzle plate 66 are preferably, although not necessarily, equal to or slightly smaller in diameter than the nozzles 40. This assures, upon actuating the transducer 72, equal or greater flow of the ink through the nozzle 40 rather than back to an associated manifold. It will be appreciated that in order for the individual nozzles 40 in an array such as that provided by the print head 20 to exhibit a minimum and acceptable variation in performance, it is necessary that both the nozzles and the restrictor orifices be of uniform size. The nozzles and restrictor orifices can be formed in a number of ways, such as by drilling or electroforming using masks, but it has been found that greatest accuracy and uniformity with the lowest cost is achieved by means of punching. The plates 52, 54, 58, 64, and 66 are typically fabricated from stainless steel, although numerous other materials can be used, and have typical thicknesses, respectively, of 0.003,0.010, 0.024, 0.006, and 0.003 inches. As in the instance of the chambers 32, 34 formed in the chamber plate 54, the holes 46, 48, 60 and 62, and compartment 56 can be formed in a suitable manner as by etching and extend completely through the thickness of their associated plates.

Referring again to FIGS. 1 and 2, an array of the transducers 72 is suitably bonded to the diaphragm plate 52, as by means of an epoxy or low temperature solder, and positioned directly over each of the compression chambers 32, 34. The adhesive employed in the present invention to bond the piezocerramic material to the diaphragm should preferably be applied so as to be uniform in thickness, have a high Young's modulus and assure consistent electrical contact between the diaphragm and the piezoceramic material. The thickness of the diaphragm material ranges between 0.001 and 0.005 inches. However, when non-conducting adhesives are employed, there must be intimate contact between portions of the diaphragm and portions of the transducer material to assure electrical continuity with the adhesive material filling the remaining interstices. In any event, the diaphragm has a comparable stiffness to the piezoceramic material.

As seen especially well in FIGS. 2A and 3, a gasket 78 of suitable sealing material capable of preventing the entry of fluids is bonded to the upper surface of the diaphragm plate 52 and encircles the transducers 72. Then all of the plates 22 including the clamping board 50 are assembled into the configuration diagramatically illustrated in FIG. 2. The undersurface of the clamping board engages the gasket 78 and isolates the transducers 72 from the surrounding atmosphere. However, before the clamping board is mounted on the diaphragm plate 52, a pair of planar, rectangular, and anisotropic connectors 80 are positioned to overlie each of the parallel groupings of the transducers 72. Additionally, a sheet of resilient buffer material 81 such as a silicone foam elastomer is interposed between flex cable 82 carrying multiple integral electrical leads 83 and the clamping board 50. The combined thickness of the transducers and connectors is chosen to be slightly less than that of the gasket 78. In this manner, when the clamping board 50 is mounted on the diaphragm plate 52, and the buffer material 81 squeezed between the flex cable and the clamping board, the connectors are firmly positioned and frictionally held against movement on the transducers 72. Furthermore, by reason of the gasket 78, the transducers 72, connectors 80, and electrical leads 83 are isolated from ink and other fluids.

The connectors 80 may be made of any suitable type of sheet material such as a polymer which is electrically non-conductive in planar directions, but is conductive in a direction transverse to the plane in which it lies. A typical example of the material used for the connectors 80 is that manufactured by Shin-Estu Polymer Co., Ltd of Tokyo, Japan under the trademark Shin-Estu Inter-Connector.

Beneath the clamping board 50, each individual electrical lead 83 engages the upper surface of the connector 80 so as to be coextensive with an individual, associated one of the transducers 72. Thus, there are as many electrical leads 83 as there are transducers 72. However, it will be appreciated that the invention also encompasses a construction in which each lead 83 interfaces directly with its associated transducer without utilizing the connectors 80. In either event, the flex cable 82 extends from its end firmly gripped between the clamping board 50 and the diaphragm plate 52, then is looped so as to overlie an upper surface of the clamping board. A driver chip 84, which is a suitable integrated circuit, may be surface mounted on the clamping board 50 and serves as an interface between the electrical leads 83 representing output circuits from the transducers 72 and a plurality of electrical leads 86 which may represent input circuits integral with a flex cable 87. The driver chip 84 serves to translate serial electrical signals as they are received from a computer (not shown) via the flex cable 87 and translates them into parallel signals for transmission to the transducers 72 via the leads 83 and connectors 80. By this arrangement, the number of input circuit leads 86 can be substantially reduced, and therefore simplified, in contrast to the number of output circuit leads 83 required to operate the print head 20.

Should air enter the system between the restrictor orifices 36, 38 and the nozzles 40, it can adversely affect the operation of the print head 20. Such adverse effects include reduction in the droplet emission speed, that is, velocity of the droplets, or failure to eject a droplet altogether.

In order to avoid the entry of air into the body of the print head 20, a venting system is provided to remove any air present in the ink stream as it passes though the manifolds 28, 30. Specifically, viewing FIG. 2B, the nozzle plate 66 is provided with feeder holes 88 and 90 which are aligned to be in communication with the manifolds 28 and 30, respectively. Each feeder hole 88 and 90 communicates with an associated channel, 92 and 94 respectively, formed in the intermediate plate 64.

Each channel, 92 and 94 is, in turn, aligned with an air nozzle, 95 and 96, respectively, formed in the nozzle plate 66. The air nozzles 95 and 96 are of a size similar to the ink nozzles 40 and are generally aligned on the plate 66 with the nozzles 40. Thus, as ink flows into the manifolds 28, 30 along the paths **26*a* and 26*b*, any air accompanying the ink will pass through the feeder holes 88, 90, along the channels 92 and 94 and then through the air nozzles 95 and 96 to return to the surrounding atmosphere. The bubble free ink will then pass through the restrictor orifices 36, 38 into the chambers 32, 34 and thence out through the nozzles 40** in discrete droplets.

A primary feature of the invention resides in the provision of the manifolds 28, 30, being positioned externally of the plates 22. This avoids the necessity of forming the manifolds in one of the plates in a costly operation. Furthermore, the manifolds can be fabricated from less expensive materials when located externally of the plates 22. Another benefit resides in the ability to make the manifolds compliant when they are positioned externally.

With respect to the matter of compliance, it will be appreciated that when pressurized ink is introduced into the manifolds 28, 30, then drawn through the restrictor orifices 36, 38 into the main part of the print head 20 by reason of the operation the transducers 72 and diaphragm plate 54, pressure variations at one of the restrictor orifices can have an effect on neighboring restrictor orifices resulting in the phenomenon known as "cross talk". Specifically, signals intended for the ejection of ink from one nozzle can undesireably be transmitted to another nozzle causing improper timing of ink droplets from the other nozzle. However, by reason of the present invention, with the manifolds 28, 30 being fabricated so as to be compliant, cross talk is substantially reduced and even eliminated.

A manifold is said to be compliant when it absorbs pressure occurring in the fluid or ink therein. These pressure waves can be present both in the entering stream of ink along paths **26*a* and 26*b* and resulting from pressure pulses transmitted through the restrictor orifices 36, 38 upon operation of the transducers 72. The compliance of the manifold is defined as dv/dp where V=volume and p=pressure and is a function of its thickness, shape, cross sectional area, and modulus of elasticity, in short, its stiffness. For efficient operation of the print head 20, this compliance must be at least great enough so that only a minimal pressure is created in the manifold from either of the sources noted above. To this end, each manifold 28, 30** is formed of a continuous wall 98 (see FIG. 2B) defining an internal cavity 100. The wall of the manifold 28 is suitably bonded to an undersurface of the nozzle plate 66 as by a suitable adhesive such that the cavity 100 is coextensive with the elongated hole 62, with the feeder hole 88, and with the restrictor orifices 36 positioned therebetween. In a similar fashion, wall 98 of the manifold 30 is bonded to the undersurface of the nozzle plate 66 so that its cavity 100 is coextensive with the elongated hole 62, feeder hole 88, restrictor orifices 38 therebetween.

In the instance of both manifolds 28 and 30, a compliant sheath 102 is suitably bonded to the wall 98 so as to completely overlie the cavity 100 and isolate the cavity from the surrounding atmosphere. The compliant sheath preferably has a thickness between one and three mils and can be composed of a variety of materials. Such materials can include, by way of example, metal foils or polymeric film such as polyethylene or "Saran" plastic manufactured by Dow Chemical Company of Midland, Michigan. Thus, as ink is introduced into the manifolds 28, 30 along the paths 26*a* and 26*b*, respectively, pressure pulses occurring as the ink flows through the individual restrictor orifices 36, 38 are absorbed by the compliant sheath 102 thereby assuring that nozzles not intended to be affected by a pressure pulse will indeed not be so affected.

Another aspect of the invention will now be described with continuing reference especially to FIG. 2A. With more particular reference therein to plates 52 and 54, it will be noticed that each grouping of the chambers 32 and of the chambers 34 is numerically the same as the transducers 72 on plates 52. For reasons which will become clearer with further description, the chambers 32 and 34 can be more specifically referred to as active ink chambers. Thus, the grouping of active ink chambers 32 begins with a first chamber 104 and extends to a last chamber 106. In a similar fashion, the grouping of active ink chambers 34 begins with a first chamber 108 and extends to a last chamber 110. As illustrated, the chambers 104 and 108 are axially aligned and, similarly, chambers 106 and 110 are axially aligned.

Also formed in the chamber plate 54 are a pair of first passive ink chambers 112 and 114 positioned, respectively, beside, or adjacent to, the chambers 104 and 108. Also, the chambers 112 and 114 are sized and shaped similarly to the chambers 104 and 108. At the opposite end of the chamber groupings are formed last passive ink chambers 116 and 118 which bear the same size and spatial relationships with the respective groupings 32 and 34 as do the passive ink chambers 112 and 114. Each of the passive ink chambers 112 and 114 is blind in that it has no inlet and no outlet. The passive ink chambers 116 and 118 may be similarly blind, or they may have inlets and outlets. In the latter event, it would be desirable to vent those particular ink chambers to the atmosphere. This would be particularly desirable when the print head 20 is used in such a manner that all of the plates, including the chamber plate 54 lie in a vertical plane with the chambers 116 and 118 positioned above all of the other chambers. In this situation, air entrapped in the ink would rise to the uppermost chambers, namely the chambers 116 and 118 and must then be removed from the system. The restrictors and the nozzles associated with the chambers 116 and 118, when they are not of a blind construction, would be similarly dimensioned to those elements associated with the active chambers, having for example, a diameter of approximately 0.003 inches. With such a dimension, the surface tension of the ink customarily used with the print head would be of a value which would prevent the ink from leaving the chamber, either via the restrictor or via the nozzle, once it had been introduced. However, any air which would enter the chambers 116, 118 would exit via the associated nozzle.

In any event, it will be apparent that sidewalls 120 are formed between all of the ink chambers, whether they are passive ink chambers or active ink chambers. Furthermore, in each instance they are similarly sized and shaped. In this manner, identical structural stiffness is provided on both sides of all of the active chambers including the end active chambers 104, 106, 108 and 110. Thus, the characteristics of operation of the jet associated with each of the active ink chambers 32 and 34 is maintained substantially uniform. Of course, it will be noticed that while each of the passive ink chambers 112, 114, 116, and 118 borders a sidewall 120, its other sidewall is a relatively large mass, or portion, of the plate 54. However, with the passive ink chambers there is no concern for this large bordering mass. This follows by reason of the fact that the passive ink chambers have no transducers or nozzles with them and are not involved in the ink ejection process.

Figure 4:
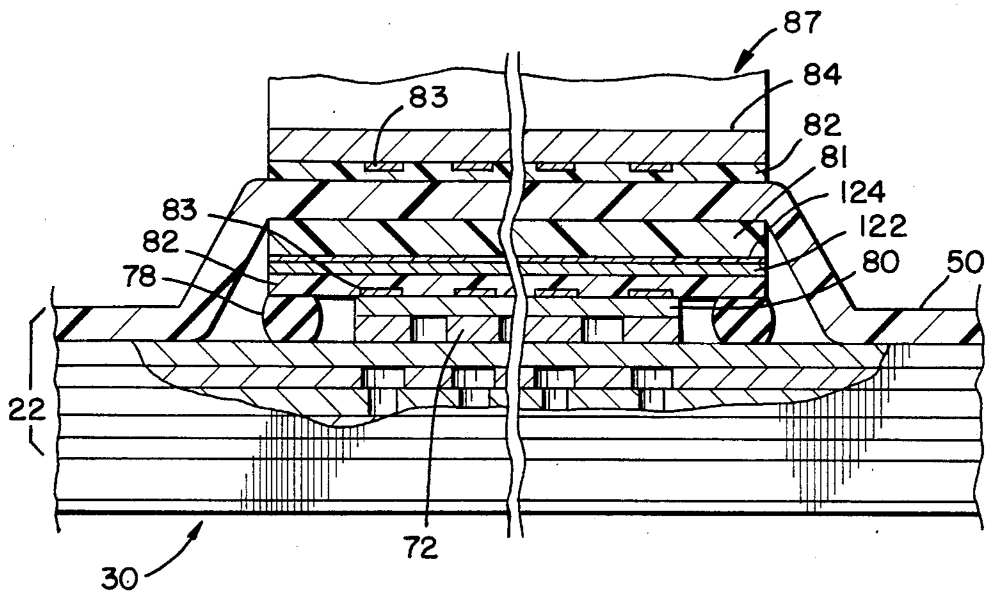
FIG. 4 is a cross section view similar to FIG. 3 but depicting another embodiment of the invention.

Another embodiment of the invention is illustrated in FIG. 4 which is similar to FIG. 3 but includes the provision of an appropriate heater to control the viscosity of the ink within the print head 20. Specifically, an addition can be made to the print head so that it includes a suitable ribbon heater 122, such as THERMOFOIL brand etched foil heater manufactured by Minco Products, Inc. of Minneapolis, MN, which is overlaid with a flex foil layer 124. The ribbon heater 122 serves to elevate the temperature of the ink to approximately 40° C. (approx. 100° F.) In this manner, improved control is obtained over the velocity of an ink droplet and specific placement of that droplet on a receiving surface. A flex foli layer 124 which may be, for example, aluminum foil with a plastic backing, serves to reflect and control the heat which emanates from the ribbon heater 122.

Thus, the invention as disclosed herein, provides for a greatly simplified design of an ink jet print head utilizing a plurality of plates or laminae resulting in ease of fabrication, while preserving uniformity of sizes for the restrictor orifices and nozzles as well as increased nozzle density by reason of the interlacing arrangement of the nozzles and their associated chambers. An arrangement has also been disclosed which enables relatively few input circuits to operate a relatively large number of output circuits for driving a similarly large number of nozzles; on a venting system which removes air from the manifolds before it enters the main portions of the print head; and on external manifolds which, in addition to economy of fabrication, is of a compliant construction which is effective for eliminating cross-talk.

While a preferred embodiment of the invention has been disclosed in detail, it should be understood by those skilled in the art that various modifications may be made to the illustrated embodiment without departing from the scope as described in the specification and defined in the appended claims.

I claim:

1. An impulse ink jet print head of the type including a plurality of operating plates, all lying in parallel planes, held together in a contiguous superposed relationship comprising:

a first plate including a plurality of nozzles therein for ejecting droplets of ink therethrough;

a second plate defining a plurality of ink chambers therein;

an ink supply including compliant manifold means external of said plurality of operating plates;

first passage means connecting each of said chambers to said ink supply;

each of said chambers overlying an associated one of said nozzles and having an outlet for directing ink thereto; and a third plate contiguous with said second plate and including driver means for displacing ink in said chambers thereby causing the ejection of ink droplets from each of said nozzles.

2. An impulse ink jet print head as set forth in claim 1 wherein:

said first passage means includes a plurality of restrictor orifices, each of said restrictor orifices being associated with one of said nozzles.

3. An impulse ink jet print head as set forth in claim 2 wherein:

each of said restrictor orifices has a cross sectional area no greater than that of its associated one of said nozzles.

4. An impulse ink jet print head as set forth in claim 2 wherein:

said restrictor orifices are located in said first plate.

5. An impulse ink jet print head as set forth in claim 2 wherein:

said first plate has an outer surface;

wherein:

said manifold means includes:

a continuous wall mounted on said outer surface and defining a cavity therein containing said restrictor orifices; and resilient sheet material mounted on said wall and overlying said cavity.

6. An impulse ink jet print head as set forth in claim 5 wherein:

said sheet material has a compressibility sufficient to absorb pressure waves within said cavity occurring between restrictor orifices.

7. An impulse ink jet print head as set forth in claim 1 wherein said second plate defines at least a pair of generally coplanar ink chambers having relatively long sidewalls and relatively short endwalls, each of said chambers being axially aligned along their major axes and proximately opposed to one another at their said endwalls, each of said opposed endwalls extending toward the other of said chambers in an interlaced relationship and overlapping a plane transverse to said second plate and containing axes of the outlets from said chambers and axes of both of said nozzles.

8. An impulse ink jet print head as set forth in claim 7 wherein the transverse plane is perpendicular to the major axes of said chambers.

9. An impulse ink jet print head as set forth in claim 1 wherein said outlets and their associated said nozzles are aligned on an axis perpendicular to the plane of said chambers.

10. An impulse ink jet print head as set forth in claim 1 including:

venting means connecting said manifold means with the atmosphere to thereby prevent excessive build-up of air pressure in said manifold means.

11. An impulse ink jet print head as set forth in claim 10 wherein:

said venting means includes:

a venting nozzle in said first plate;

conduit means extending between said manifold means and said venting nozzle enabling flow of air between said manifold means and the atmosphere.

12. An impulse ink jet print head as set forth in claim 1 wherein said second plate defines a plurality of pairs of generally coplanar ink chambers, each of said chambers having relatively long sidewalls and relatively short endwalls and each pair of said chambers being axially aligned along their major axes and proximately opposed to one another at their said endwalls, each of said opposed endwalls extending toward the other of said chambers in an interlaced relationship and overlapping a plane transverse to said second plate and containing axes of both of said nozzles.

13. An impulse ink jet print head as set forth in claim 12 wherein the transverse plane is perpendicular to the major axes of said chambers.

14. An impulse ink jet print head as set forth in claim 12 including:

a first set of ink chambers;

a second set of ink chambers in an interlaced relationship with said first set; and wherein:

said restrictor orifices associated with said first set of ink chambers are located on one side of said transverse plane and distant therefrom; and wherein:

said restrictor orifices associated with said second set of ink chambers are located on the other side of said transverse plane and distant therefrom.

15. An impulse ink jet print head as set forth in claim 14 wherein:

said manifold means includes:

a first manifold mounted on said nozzle plate communicating with said first set of ink chambers via said restrictor orifices; and a second manifold mounted on said nozzle plate spaced from said first manifold communicating with said second set of ink chambers via said restrictor orifices.

16. An impulse ink jet print head as set forth in claim 15 wherein:

said manifold means includes first and second spaced manifolds communicating, respectively, with said first set and with said second set of ink chambers via said restrictor orifices.

17. An impulse ink jet print head as set forth in claim 16 wherein:

said first plate has an outer surface;

wherein:

each of said first and second manifolds includes:

a continuous wall mounted on said outer surface and defining a cavity therein containing said restrictor orifices; and resilient sheet material mounted on said wall and overlying said cavity.

18. An impulse ink jet print head as set forth in claim 17 wherein:

said sheet material has a compressibility sufficient to absorb pressure waves within said cavity between said restrictor orifices.

19. An impulse ink jet print head as set forth in claim 1 wherein:

said driver means includes:

a plurality of piezoceramic transducers fixed on said third plate, each said transducer being generally coextensive with each of said chambers;

a clamping board overlying said third plate and fixed thereto;

a plurality of input circuits for carrying electrical signals from a computer to said print head;

a plurality of output circuits, each having electrical continuity with one of said transducers; and an IC driver chip connecting said input circuits and said output circuits and operable to convert signals from said input circuits to parallel signals for transmission to said transducers.

20. An impulse ink jet print head as set forth in claim 19 wherein:

said driver means includes:

a planar anisotropic connector overlying said piezoceramic transducers and interposed between said third plate and said clamping board, said connector having an upper surface facing said clamping board and a lower surface facing said third plate and being electrically conductive only in a transverse direction;

each of said output circuits engaging said upper surface of said connector for electrical continuity with an associated one of said transducers.

21. An impulse ink jet print head as set forth in claim 19 including:

resilient gasket means extending continuously around said piezoceramic transducers between said third plate and said clamping board for sealing said transducers against fluid entry.

22. An impulse ink jet print head as set forth in claim 21 including, in successive contiguous layers between said transducers and said clamping board:

flex cable incorporating therein said output circuits;

a ribbon heater;

flex foil layer; and resilient buffer material for firmly maintaining all of said layers in fixed relative positions on said print head.

23. An impulse ink jet print head as set in claim 22 wherein:

said second plate defines a plurality of generally coplanar active ink chambers therein, said active ink chambers having relatively long sidewalls and relatively short endwalls and being positioned generally in side-by-side relationship between a first one and a last one thereof;

said second plate defines a first passive chamber sized and shaped similarly to said active ink chambers and positioned adjacent said first one of said plurality of said active ink chambers;

said second plate defines a second passive chamber sized and shaped similarly to said active ink chambers and positioned adjacent said last one of said plurality of said active ink chambers; and said passive chambers have no inlets and no outlets.

24. An impulse ink jet print head as set in claim 22 wherein:

said second plate defines a plurality of generally coplanar active ink chambers therein, said active ink chambers having relatively long sidewalls and relatively short endwalls and being positioned generally in side-by-side relationship between a first one and a last one thereof;

said second late defines a first passive chamber sized and shaped similarly to said active ink chambers and positioned adjacent said first one of said plurality of said active ink chambers;

said second plate defines a second passive chamber sized and shaped similarly to said active ink chambers and positioned adjacent said last one of said plurality of said active ink chambers; and said print head is oriented such that said first passive chamber is positioned lower than said second passive chamber; and wherein:

said first passive chamber has no inlet and no outlet; and including:

passage means connecting said second passive chamber to said ink supply;

a nozzle associated with said second passive chamber; and an outlet connecting said second passive chamber to said associated nozzle for venting air from said passive chamber.

25. An impulse ink jet print head as set forth in claim 19 wherein:

said driver means includes:

a planar anisotropic connector overlying said piezoceramic transducers and interposed between said third plate and said clamping board, said connector having an upper surface facing said clamping board and a lower surface facing third plate and being electrically conductive only in a transverse direction;

each of said output circuits engaging said upper surface of said connector for electrical continuity with an associated one of said transducers.

26. An impulse ink jet print head as set forth in claim 1 including heater means for controlling the viscosity of the ink.

27. An impulse ink jet print head as set in claim 1 including:

venting means connecting said manifold means to the atmosphere for enabling air accompanying the ink to return to the surrounding atmosphere.

28. An impulse ink jet print head as set forth in claim 1 including:

a taper plate intermediate said first plate and said second plate defining an air receiving channel therein;

said first plate including:

a feeder hole connecting said manifold means to said channel; and an air nozzle communicating with said channel, whereby any air accompanying the ink from said manifold means will be caused to return to the surrounding atmosphere.

29. An impulse ink jet print head comprising:

a plurality of operating plates, all lying in parallel planes, including at least:

a first plate including a plurality of nozzles therein for ejecting droplets of ink therethrough;

a second plate defining a plurality of pairs of generally coplanar axially aligned elongated chambers having relatively long sidewalls and relatively short endwalls, pairs of said chambers being in side by side relationship along their respective said sidewalls;

an ink supply including compliant manifold means external of said plurality of operating plates;

each of said chambers connected to said ink supply and having an outlet for directing it toward an associated one of said nozzles in said first plate;

each of said nozzles having a central axis extending transversely to the planes of said plates and intersecting said second plates at proximate extremities of each of said chamers;

said plates having passage means connecting each of said nozzles with an associated one of said outlets;

a third plate proximate to said second plate and including drive means for displacing ink in each of said chambers thereby causing the ejection of ink droplets from each of said nozzles.

30. An impulse ink jet print head as set forth in claim 29 wherein:

said first passage means includes:

a plurality of restrictor orifices, each of said restrictor orifices being associated with one of said nozzles.

31. An impulse ink jet print head as set forth in claim 30 wherein:

each of said restrictor orifices has a cross sectional area no greater than that of its associated one of said nozzles.

32. An impulse ink jet print head as set forth in claim 30 wherein:

said restrictor orifices are located in said first plate.

33. An impulse ink jet print head as set forth in claim 29 wherein:

said chambers are generally rectangular in shape and wherein:

said driver means includes a generally rectangular piezoceramic transducer fixed on said third plate so as to be generally coextensive with each of said chambers.

34. An impulse ink jet head as set forth in claim 33 wherein said first plate includes:

a pair of restrictor orifices therein, each of said restrictor orifices positioned intermediate said ink supply and an associated one of said chambers, each of said restrictor orifices being generally similar in size to each of said nozzles.

35. An impulse ink jet print head as set forth in claim 34 wherein:

a matched pair of said chambers is axially aligned along their major axes and proximately opposed to one another at their said endwalls, each of said opposed endwalls extending toward the other of said chambers in an interlaced relationship and overlapping a plane transverse to said second plate and containing axes of the outlets from said chambers and axes of both of said nozzles.

36. An impulse ink jet printing head as set forth in claim 8 wherein:

the axes of said restrictor orifices, of said outlets, and of said nozzles are all perpendicular to the plane of said chambers.

37. An impulse ink jet print head of the type including a plurality of planar operating plates held together in a contiguous superposed relationship comprising:

a nozzle plate including a plurality of nozzles therein for ejecting droplets of ink therethrough;

a chamber plate defining sidewalls for a plurality of ink chambers therein;

an ink supply including compliant manifold means external of said plurality of operating plates;

a base plate proximate to said chamber plate and defining a floor for each of said chambers;

first passage means connecting each of said chambers to said ink supply;

second passage means connecting each of said chambers to an associated one of said nozzles; and a diaphragm plate proximate to said chamber plate and defining a roof for each of said chambers therein, and including driver means for displacing ink in said chambers thereby causing the ejection of ink droplets from each of said nozzles.

38. An impulse in jet print head as set forth in claim 37 wherein said first passage means includes:

a plurality of restrictor orifices in said nozzle plate, each of said restrictor orifices being associated with one of said nozzles and having a cross sectional area no greater than that of its associated one of said nozzles; and said base plates having a plurality of first holes therethrough, each aligned, respectively, with an associated one of said restrictor orifices and with an associated one of said chambers; and wherein said second passage means includes:

said base plate having a plurality of second holes therethrough, each aligned, respectively, with an associated one of said nozzles and with a associated one of said chambers.

39. An impulse ink jet print head as set forth in claim 38 wherein:

said first holes have a larger aperture than said restrictor orifices; and wherein:

said second holes have a larger aperture than said nozzles; and including:

a plate intermediate said nozzle plate and said base plate; and wherein said first passage means includes:

said intermediate plate having a plurality of first intermediate holes therethrough, each aligned, respectively, with an associated one of said first holes and with an associated one of said restrictor orifices, the aperture of each of said first intermediate holes being congruent with the aperture of its associated said first hole at the interface of said base plate and said intermediate plate, the aperture of each of said first intermediate holes being congruent with the aperture of its associated said restrictor orifice at the interface of said intermediate plate and said nozzle plate; and wherein said second passage means includes:

said intermediate plate having a plurality of second intermediate holes therethrough, each aligned, respectively, with an associated one of said second holes and an associated one of said nozzles, the aperture of each of said second intermediate holes being congruent with the aperture of its associated said second hole at the interface of said base plate and said intermediate plate, the aperture of each of said second intermediate holes being congruent with the aperture of its associated said nozzle at the interface of said intermediate plate and said nozzle plate.

40. An impulse ink jet print head as set forth in claim 39 wherein:

said driver means includes:

a plurality of piezoceramic transducers fixed on said third plate, each said transducer being generally coextensive with each of said chambers;

a clamping board overlying said third plate and fixed thereto;

a plurality of input circuits for carrying electrical signals from a computer to said print head;

a plurality of output circuits, each having electrical continuity with one of said transducers; and an IC driver chip connecting said input circuits and said output circuits and operable to convert serial signals for transmission to said transducers.

41. An impulse ink jet print head as set forth in claim 40 including:

resilient gasket means extending continuously around said piezoceramic transducers between said third plate and said clamping board for sealing said transducers against fluid entry.

42. An impulse ink jet print head of the type including a plurality of operating plates held together in a contiguous superposed relationship comprising:

a first plate including a plurality of nozzles therein for ejecting droplets of ink therethrough;

a second plate defining at least a pair of generally coplanar active ink chambers having relatively long sidewalls and relatively short endwalls, each of said chambers being axially aligned along their major axes and proximately opposed to one another at their said endwalls, each of said opposed endwalls extending toward the other of said chambers in an interlaced relationship and overlapping a plane transverse to said second plate and containing axes of the outlets from said chambers and axes of both of said nozzles;

passage means connecting each of said active ink chambers to an ink supply;

each of said active ink chambers overlying an associated one of said nozzles and having an outlet for directing ink thereto;

a third plate contiguous with said second plate and including driver means for displacing ink in said active ink chambers thereby causing the ejection of ink droplets each of said nozzles;

said second plate defining a first pair of passive ink chambers sized and shaped similarly to said pair of active ink chambers and lying to one side of said pair of active ink chambers and defining a first sidewall therebetween;

said second plate defining a second pair of passive ink chambers sized and shaped similarly to said pair of active ink chambers and lying to an opposite side of said pair of active ink chambers and defining a second sidewall therebetween;

said first and second sidewalls being equivalently sized and shaped;

each of said passive ink chambers being connected to the ink supply; and said second pair of passive ink chambers having no outlet therefrom;

whereby the characteristics of the ink as it flows from each of said active ink chambers is substantially uniform.

43. An impulse ink jet print head of the type including a plurality of operating plates held together in a contiguous superposed relationship comprising:

a first plate including a plurality of nozzles therein for ejecting droplets of ink therethrough;

a second plate defining a plurality of generally coplanar active ink chambers there, said active ink chambers having relatively long sidewalls and relatively short endwalls and being positioned generally in side-by-side relationship between a first one and a last one thereof;

passage means connecting each of said active ink chambers to an ink supply;

each of said active ink chambers overlying an associated one of said nozzles and having an outlet for directing ink thereto;

a third plate contiguous with said second plate and including driver means for displacing ink in said active ink chamber thereby causing the ejection of ink droplets from each of said nozzles;

said second plate defining a first passive chamber sized and shaped similarly to said active ink chambers and positioned adjacent said first one of said plurality of said active ink chambers;

said second plate defining a second passive chamber sized and shaped similarly to said active ink chambers and positioned adjacent said last one of said plurality of said active ink chambers;

said first passive chamber having no inlet thereto and no outlet therefrom;

said sidewalls between said passive and said active ink chambers being sized and shaped similarly to said sidewalls between each of said active ink chambers;

whereby the characteristics of operation of the ink as it flows from each of said active ink chambers is substantially uniform.

44. An impulse ink jet print head as in claim 43 wherein:

said second passive chamber is connected to the ink supply and has an outlet therefrom.

45. An impulse ink jet print head as in claim 43 wherein:

said second passive chamber has no inlet and no outlet therefrom.

* * * * *